(12) United States Patent
Nilsson

(10) Patent No.: US 6,283,306 B1
(45) Date of Patent: Sep. 4, 2001

(54) ROTATING FILTER

(76) Inventor: Harry Nilsson, Hauptstrasse 58, CH-8274 Tägerwilen (CH)

( * ) Notice: Subject to any disclaimer, the term of this patent is extended or adjusted under 35 U.S.C. 154(b) by 0 days.

(21) Appl. No.: 09/601,188

(22) PCT Filed: Jan. 20, 1999

(86) PCT No.: PCT/SE99/00081

§ 371 Date: Jul. 28, 2000

§ 102(e) Date: Jul. 28, 2000

(87) PCT Pub. No.: WO99/42195

PCT Pub. Date: Aug. 26, 1999

(30) Foreign Application Priority Data

Feb. 18, 1998 (SE) ................................. 9800474

(51) Int. Cl.[7] .......................... B01D 33/21; B01D 33/76
(52) U.S. Cl. ........................ 210/391; 210/331; 210/334
(58) Field of Search .................................. 210/391, 331, 210/334

(56) References Cited

U.S. PATENT DOCUMENTS

| | | |
|---|---|---|
| 2,655,265 | * 10/1953 | Little . |
| 3,096,278 | * 7/1963 | Francom . |
| 3,331,512 | 7/1967 | Vore . |
| 3,471,026 | * 10/1969 | Riker . |
| 3,591,009 | * 7/1971 | Luthi . |
| 4,056,473 | * 11/1977 | Nilsson . |
| 4,220,537 | 9/1980 | Takahashi et al. . |

FOREIGN PATENT DOCUMENTS

| | | |
|---|---|---|
| A979131 | 4/1951 | (FR) . |
| A1-9425140 | 11/1994 | (WO) . |

* cited by examiner

Primary Examiner—Thomas M. Lithgow
(74) Attorney, Agent, or Firm—Birch, Stewart, Kolasch & Birch, LLP

(57) ABSTRACT

A rotating filter having at least two annular filter disks each having a plurality of filter elements and being carried by a shaft for rotation about an axis perpendicular to the planes defined by the disks. A discharge chute extends into the space between the filter disks for discharging solids removed from the facing filter elements. An axial spacing between the first portion of the upper edges of the chute located radially inside radially inner edge portions of the facing filter elements of the adjacent filter disks is not less than an axial spacing between the inner edge portions, and an axial spacing between a second chute portion of the upper edges located radially outside the radially inner edge portions is not more than the axial spacing between the inner edge portions of the facing filter elements.

7 Claims, 9 Drawing Sheets

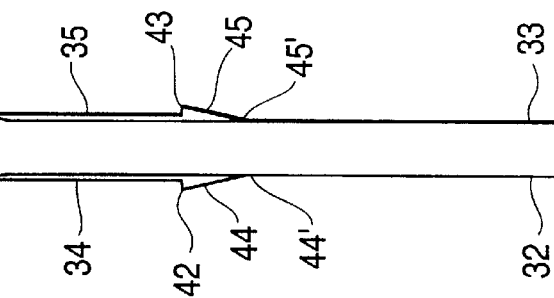
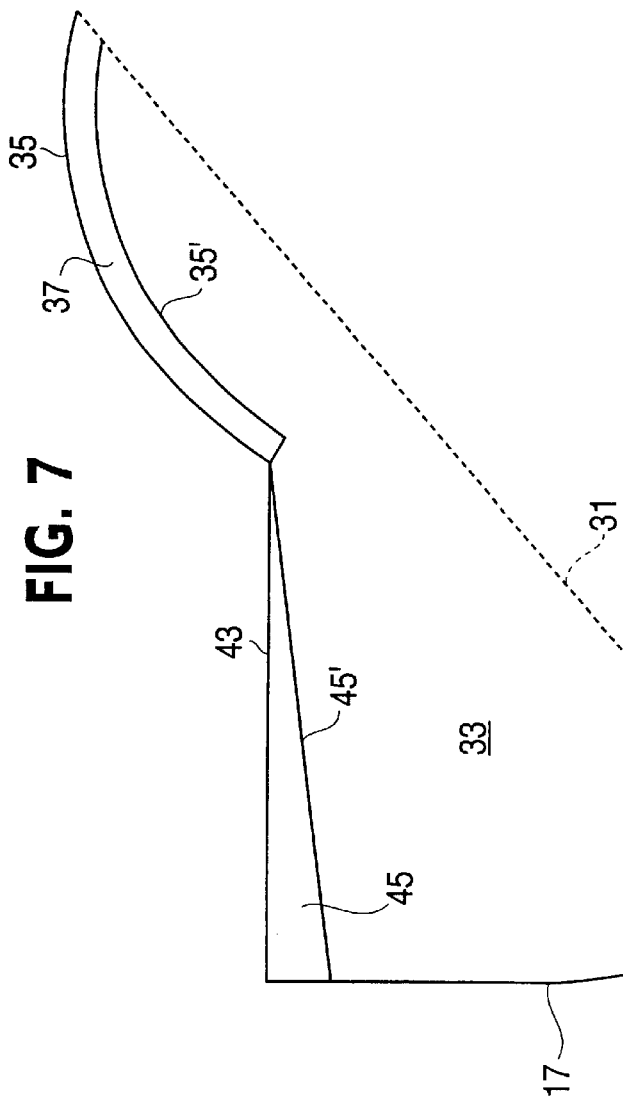
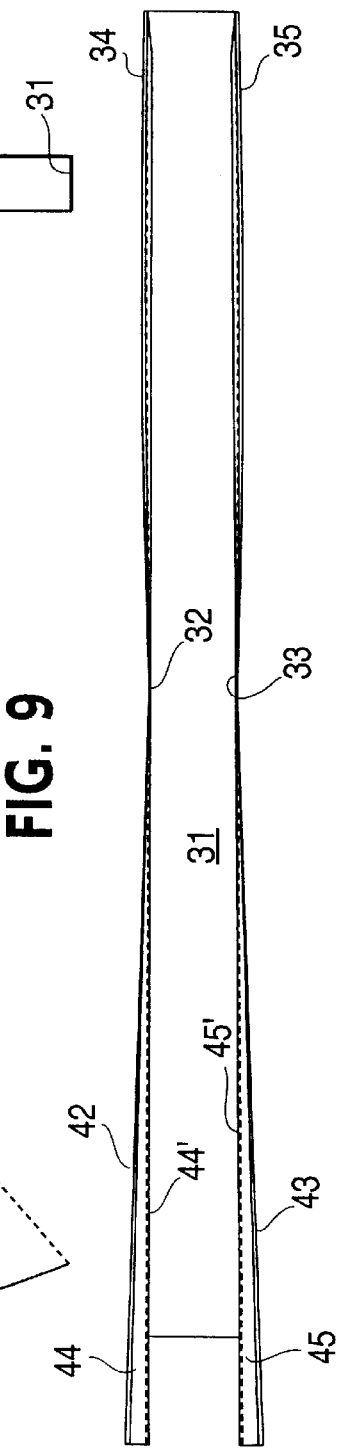

ROTATING FILTER

BACKGROUND OF THE INVENTION

1. Field of the Invention

This application is the national phase under 35 U.S.C §371 of PCT International Application No. PCT/SE99/00081 which has an International filing date of Jan. 20, 1999, which designated the United States of America.

The present invention concerns a rotating filter, said filter including at least two annular filter disks each having a plurality of filter elements and each being carried by a shaft for rotation therewith about an axis perpendicular to a respective central plane of the filter disks, said filter disks being partly submerged in a vessel adapted to contain to a certain level a liquid to be filtered, and said filter further including discharge chute means extending into a space between adjacent filter disks for discharging solids deposited on and removed from facing filtering means of said filter elements.

2. Description of Background Art

WO 94/25140 (U.S. Pat. No. 5,656,162) describes a filter where the filter elements are arranged at a relatively large distance from the shaft and have a relatively small radial extension, thereby giving the filter disks an annular appearance Therefore, a filter of this kind is referred to as a ring filter. In this prior art ring filter, the filtering means of two adjacent filter rings have a common scraper arranged radially outside the filter rings. The tip end of the scraper introduced between the filter rings is axially and radially guided by sliding in a U-shaped guide ring provided between the filter rings and rotating therewith. The scraper also has a substantially U-shaped cross section thereby to serve also as a chute for filter cake removed from the filtering means.

This prior art filter has proved to perform extremely well. However, in certain cases it has been found that, when increasing the radial height of the filter elements, the amount or volume of filter cake material deposited on the filter elements becomes so large that, after its removed from the elements, the material may not be properly discharged by the chute-like scraper running in the rotating, channel-shaped guide ring between two adjacent filter rings. Thus, it may happen that a portion of a filter cake starts to rotate and twist between the scraper and the filtering means (normally a filter cloth) of the filter element and to build up its dimension such that it eventually damages the filter cloth.

SUMMARY OF THE INVENTION

The present invention has its primary object to provide a rotating filter as initially stated, which allows a largely increased radial height of the filter sectors in comparison to those according to the prior art referred to.

However, large radial heights of filter elements are well known in the art per se, see for instance U.S. Pat. No. 3,331,512. This patent discloses filter elements in the shape of sectors having a substantial radial extension from a shaft having axially extending filtrate discharge channels therein. To receive filter cake removed from two adjacent filter disks, a chute is introduced into the space between these disks. The chute extends from a position substantially straight above and close to the shaft to a position exteriorly of the filter disks. In a zone relatively close to the shaft, the chute is defined by low side walls which substantially increase in height as the bottom of the chute steeply slopes towards the exterior of the disks, while the top edges of the side walls extend in a substantially horizontal direction to the exterior of the disks. This filter is evidently intended for handling substantial amounts of filter cake. However, the same problem as referred to above will no doubt fall upon this filter, and that because of the obvious risk that portions of filter cake removed may get pinched between and edge of the chute and a surface of a filter sector, and there start rotating and building up a considerable thickness leading to damage of filter cloth, filter sectors and/or chute, and thereby to shutdown.

It is also an object of the present invention, thus, to provide a rotating filter as initially stated which allows removal of substantial amounts of filter cake without any risks of portions thereof getting trapped between the discharge means (the chute) and a filter means of a filter sector.

According to the present invention, this is achieved in that the axial spacing between radially outer edge portion of a discharge chute located radially inside radially inner edge portions of facing filtering means of adjacent filter disks is not less than the axial spacing between said inner edge portions, and that the axial spacing between the radially outer edge portions of the discharge chute located radially outside said radially inner edge portions is not more than said axial spacing between said inner edge portions.

The term "axial" and "radial", as well as forms derived therefrom, used herein to define directions etc., refer to the rotational axis of the shaft of the filter and directions perpendicular to, or substantially perpendicular to, such axial directions.

Suitably, each filter element is radially spaced from said shaft by spacing means such that said radially inner edge portions of facing filtering means of adjacent filter elements are radially spaced from the shaft, said spacing means having less axial extension than said radially inner edge portions thereby providing space for said radially outer edge portions of said discharge chute to be located at a larger mutual axial spacing than said axial spacing between said radially inner edge portions.

Advantageously, the spacing means comprise conduit means for discharge of filtrate from the filter elements to said shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Embodiments of the present invention will now be described, reference being made to the accompanying drawings, wherein:

FIG. 7 is an axial view of solely the chute of FIG. 4 showing more in detail the various features of a preferred embodiment;

FIG. 8 is a view of the chute of FIG. 7 as seen from the left in FIG. 7;

FIG. 9 is a view from above into the chute of FIG. 7 at an enlarged scale;

DESCRIPTION OF THE PREFERRED EMBODIMENTS

Figure 1:
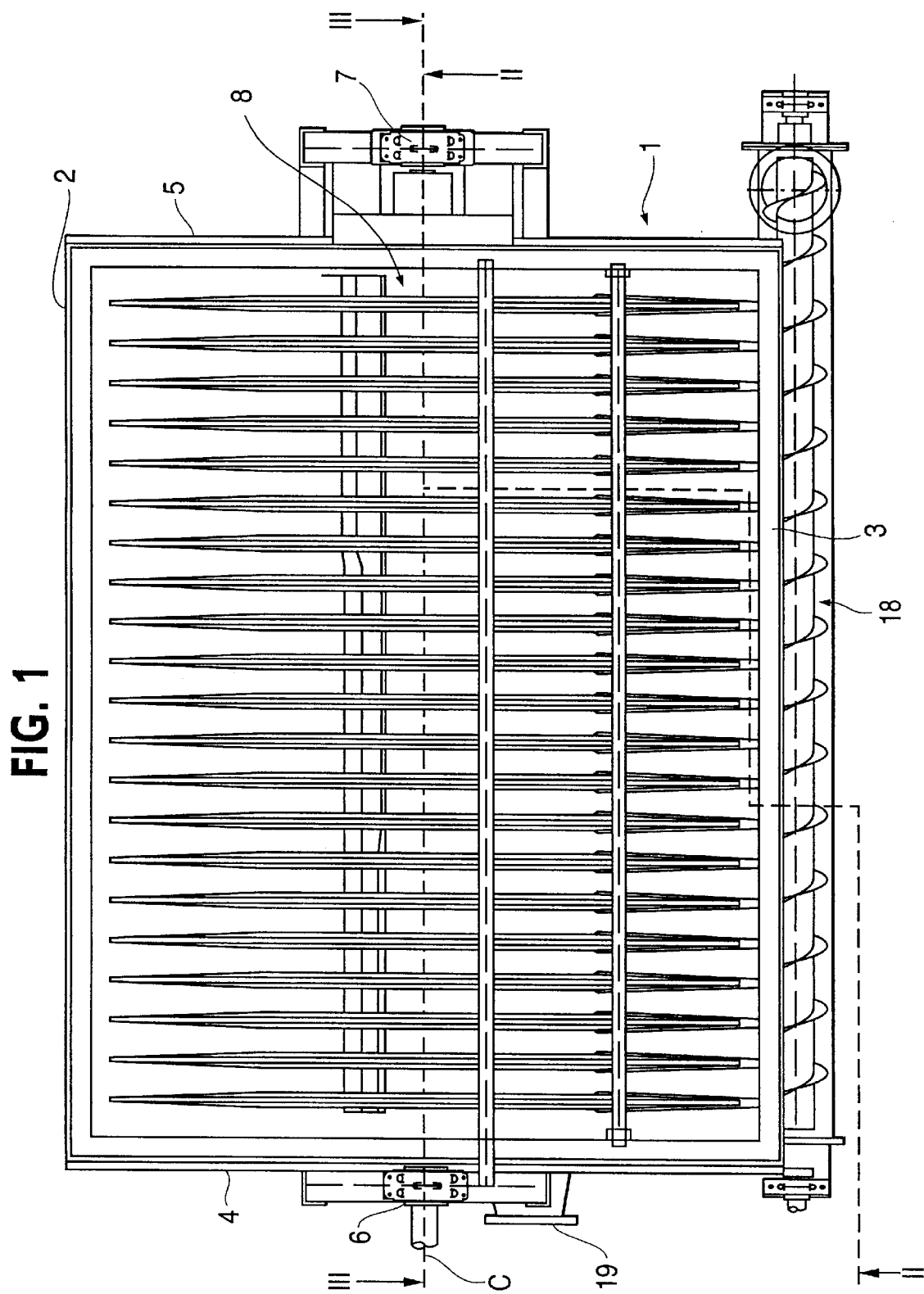
FIG. 1 is a top view of a typical filter embodying the present invention, an upper cover being removed.
Figure 2:
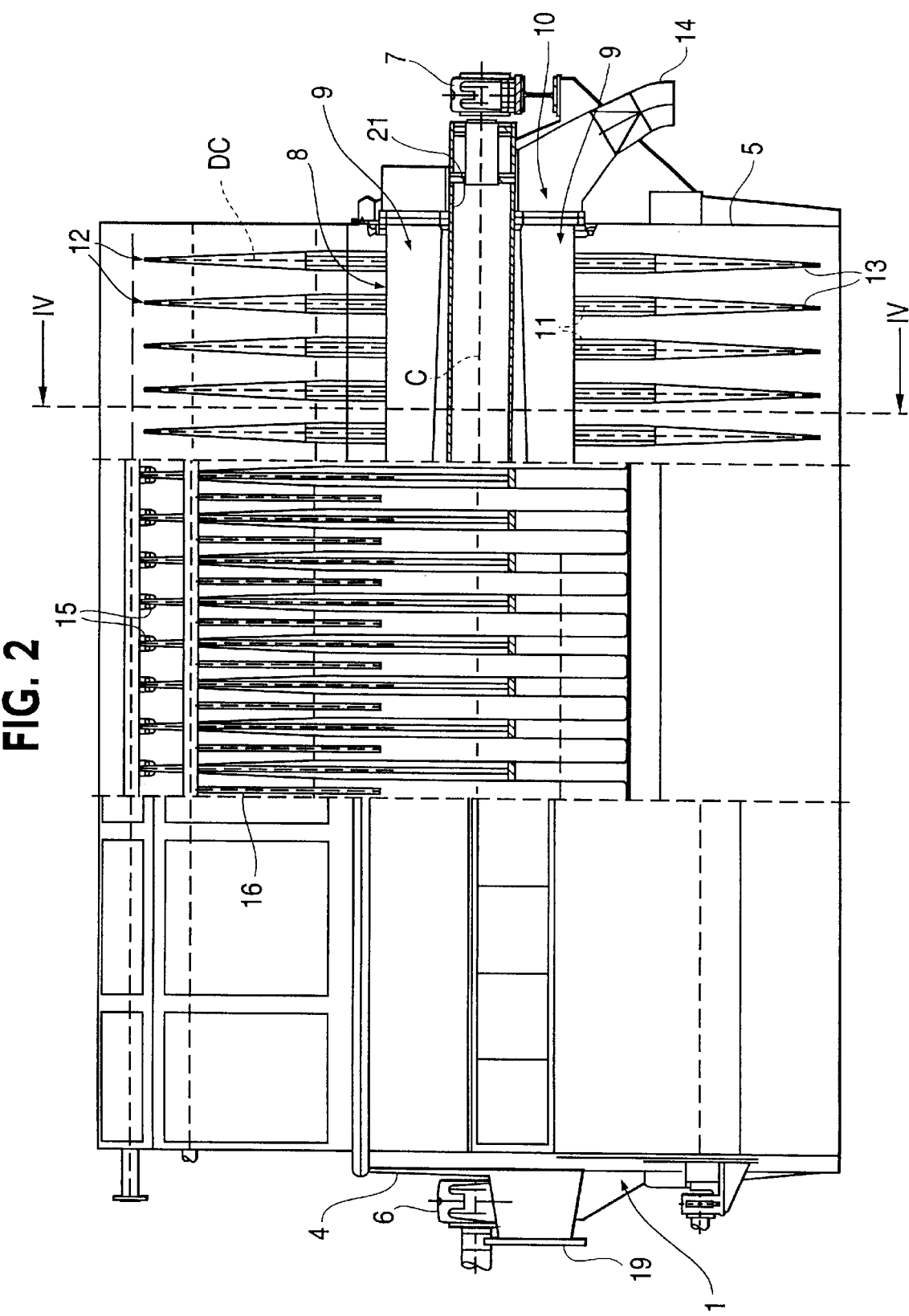
FIG. 2 is a part-sectional view along line II—II of FIG. 1.
Figure 3:
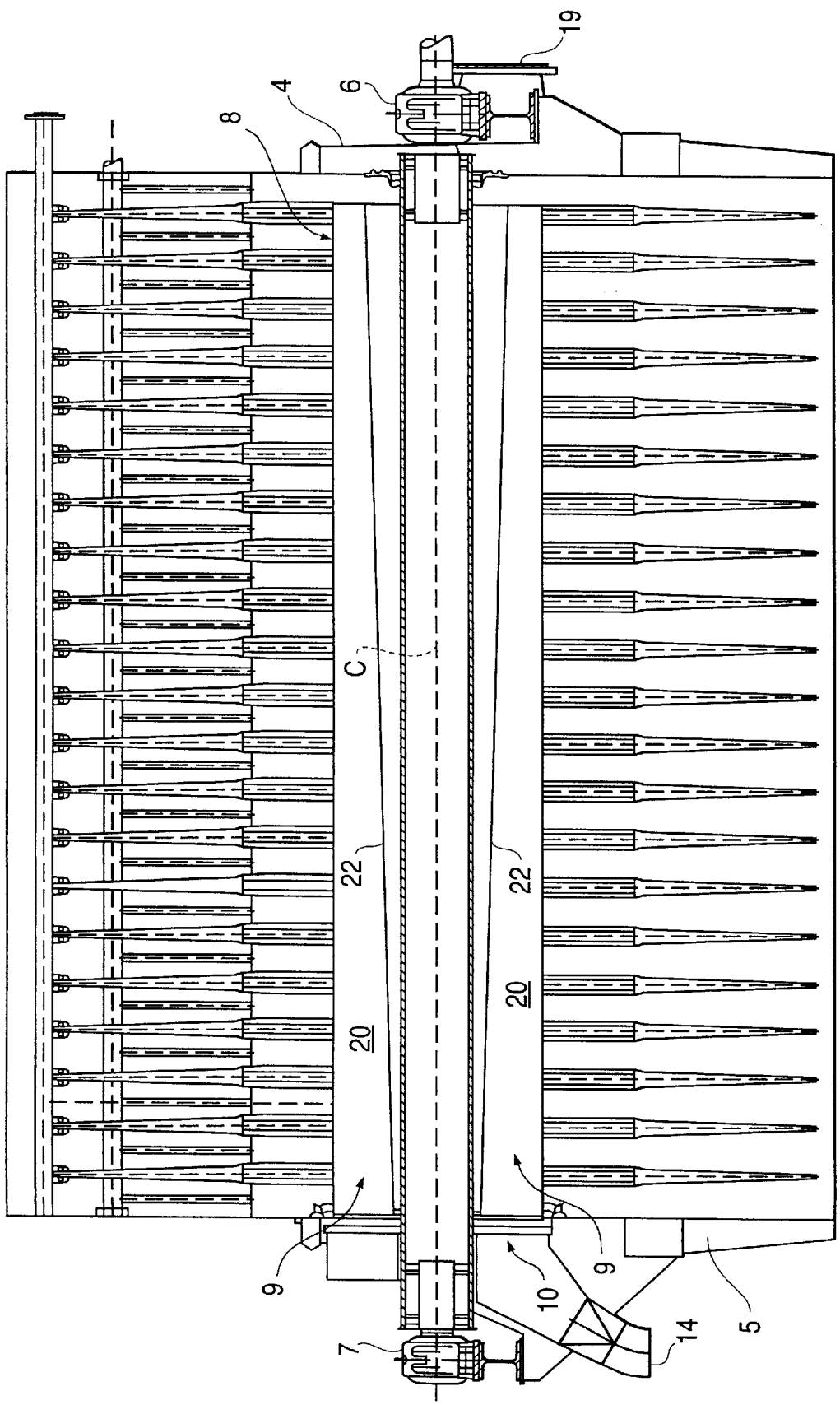
FIG. 3 is a sectional side view taken along line III—III of FIG. 1.

The over-all structure of the filter will be briefly described with reference to FIGS. 1–4. A vessel 1 adapted to contain to a certain level a liquid to be filtered (hereinafter referred to as a suspension) has longitudinal walls 2 and 3 end walls 4 and 5. Outside the latter are arranged bearings 6, 7, respectively, carrying opposed ends of a shaft 8. The shaft, that is driveable for rotatable in a direction indicated by an arrow A, carries a plurality of axially extending, circumferentially spaced filtrate channels 9 leading to a filtrate valve 10 at the left end of the filter as seen in FIG 3. Each filtrate channel 9 communicates with a plurality of axially spaced filtrate tubes 11. Each filtrate tube 11 extends in a radial direction from the respective filtrate channel 9. At its radially outer end, each filtrate tube carries a filter sector 12, such that a plurality of filter sectors located in a common radial plane constitute a filter disk. Thus, in one filter disk, each filter sector communicates through its own filtrate tube with one of the axial filtrate channels, which is common to all filter sectors having the same angular position relative to the shaft.

Each filter sector has axially opposed surfaces in the shape of a filter medium, such as a filter cloth 13, to allow filtrate to enter into the interior of the filter sector, are deposited on solid such as fibers of a pulp suspension, are deposited on the surface to form a filter cake. The filtrate is withdrawn from the interior of the filter sector through the radial filter tube 11, into the axial filtrate channel 9 and through the filtrate valve 10, which communicates with a barometric leg 14 (only the upper end shown in FIGS. 2 and 3) creating the vacuum necessary for withdrawal of filtrate.

Spray nozzles 15 are provided to promote initiating removal of filter cake by directing a jet of liquid, normally filtrate, towards radially outer portions of the filter disks 12 at rotational positions of the filter sectors close to the top of each revolution. Oscillating spray arms 16 are also provided for cleaning the filtering surfaces of the filter sectors after removal of the filter cake. A chute 17 is inserted between adjacent filter disk to receive filter cake removed from opposite surfaces 13 of adjacent disks. The chutes bring filter cake material to a discharge screw 18.

As is generally the case, the filter sectors taper towards their outer circumference symmetrically about a radial plane DC of each disk.

The arrangement of the filtrate tubes 11 as radially extending spacing means for the filter sectors results in an open structure allowing flow of suspension in an axial direction along the shaft and between the spoke-like filtrate tubes 11 from a centrally located inlet 19 in the end wall 4 of the vessel 1. Apart from the beneficial effect that the suspension is firstly centrally fed and axially distributed through the vessel 1, and secondly allowed to flow radially outwards between the filter disks, the rotating filtrate tubes 11 of each disk provide a constant stirring of the suspension leading to a uniform and optimum distribution thereof to all filter sectors submerged in the suspension. In this manner, thickening and concentration of solids in the vessel and at the outer circumference of the filter disks is eliminated. The central and axial feed of suspension makes the customary inlet box at a longitudinal side of the vessel superfluous, which is advantageous, since such inlet box is expensive in manufacture and troublesome to service and handle, particularly as regards control of the flow distribution along the suspension vessel.

Figure 4:
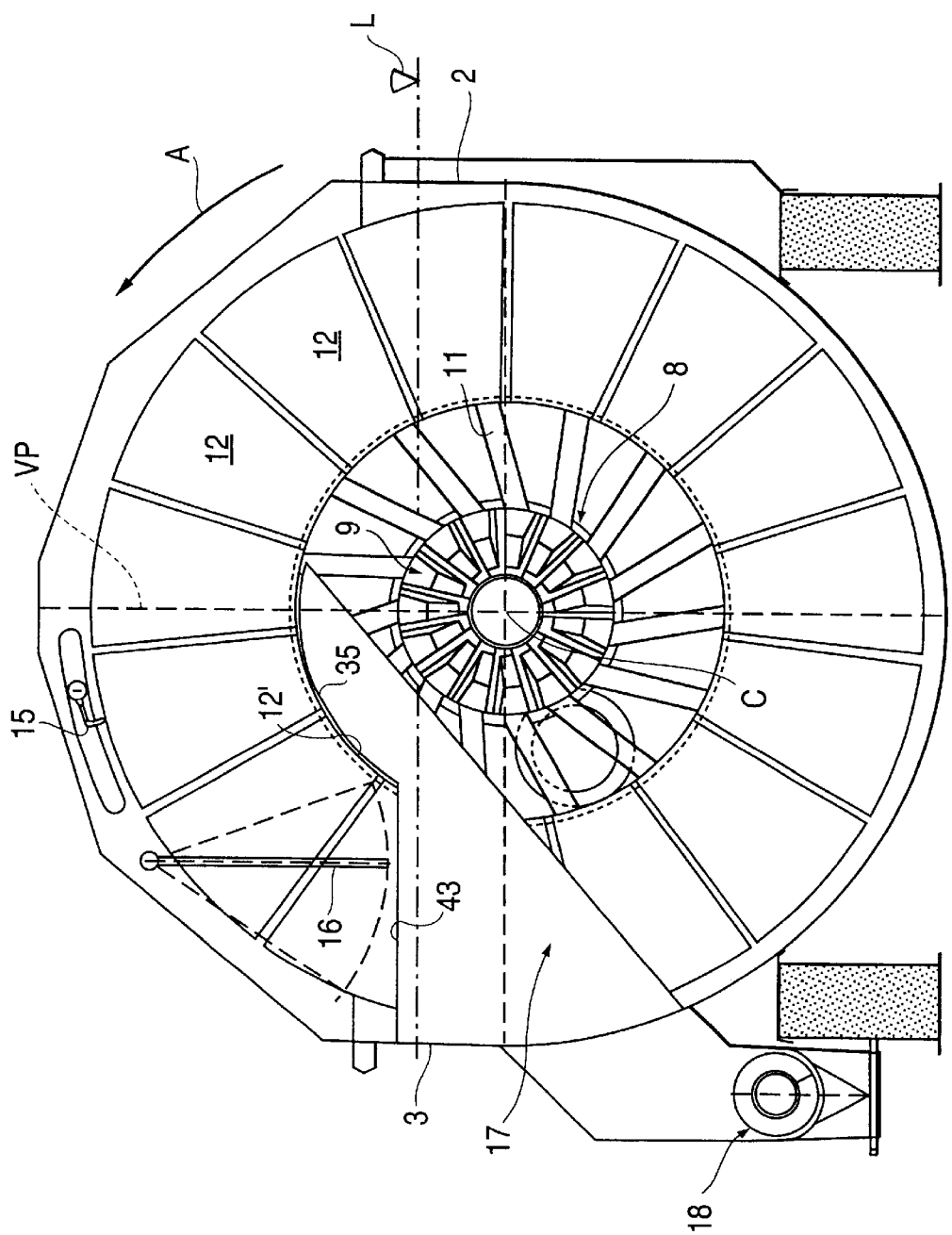
FIG. 4 is a cross section taken along line IV—IV of FIG. 2.

As appears particularly from FIG. 4, the filtrate tubes 11 are connected to the filter sectors 12 at positions close to the trailing radial edges of the sectors. It can further be seen, that the filtrate tubes 11 have a direction that is not truly radial, but substantially tangent to the periphery of the shaft 8, thereby giving the tubes downwardly inclined directions as the filter sectors raise above the level L of the liquid contained in the vessel 1. Hereby is ensured that the filter sectors are rapidly drained and the filtrate directed into the axial filtrate channels 9 at a high flow rate. It can also be seen, that the filtrate tubes 11 are upwardly inclined towards the shaft in rotational positions where the filter sectors are just submerged into the suspension. This results in that filtrate entering the filter sectors effectively displaces air from within the sectors through the upwardly inclining filtrate tubes 11 and into the axial filtrate channels 9.

It also appears from FIG. 4 (combined with FIGS. 10–13) that the filtrate tubes have a considerable length in relation to their cross section. This involves the advantage that a filtrate tube will act as a barometric leg for its associated filter sector even before the filtrate valve has connected an associated axial filtrate channel to the barometric leg 14, i.e., while cloudy filtrate is still discharged through the filtrate channel. In the top position of a filter sector, the entire length of the filtrate tube will be added to the height of the barometric leg 14 and thereby further contribute to the suction effect.

Figure 6:
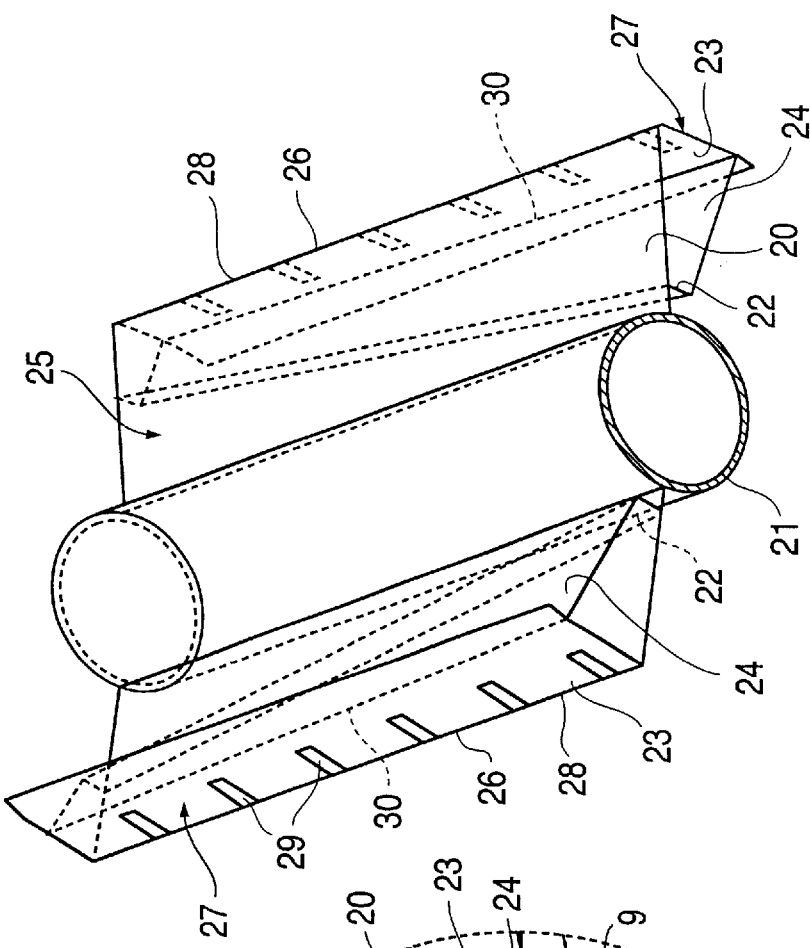
FIG. 6 is a perspective view of two diametrically opposed axial channels and a portion of the shaft core.
Figure 5:
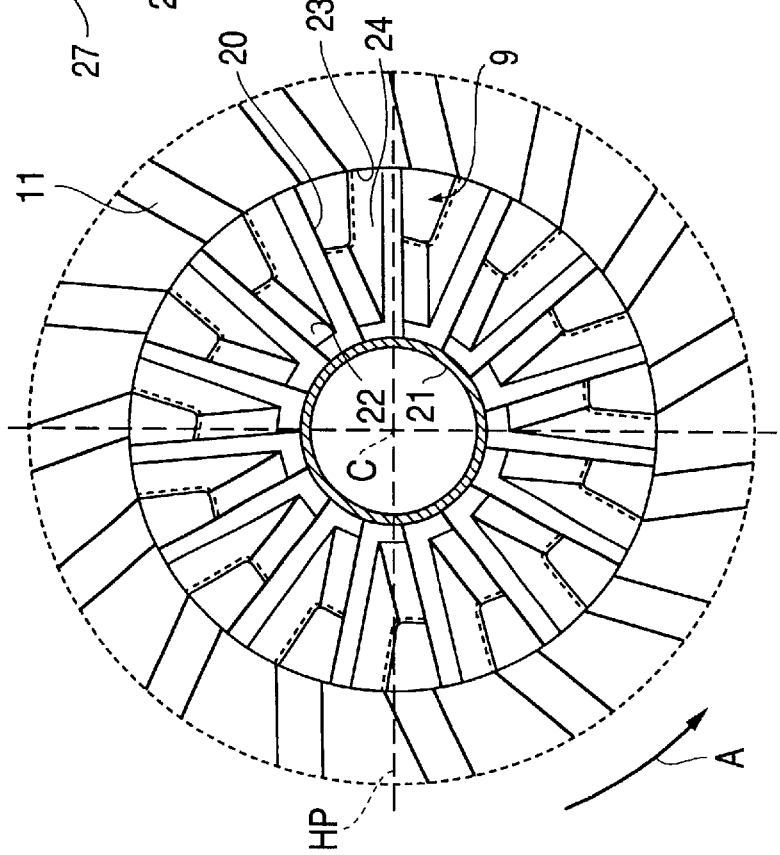
FIG. 5 is an enlarged portion of FIG. 4 particularly showing a cross section of the shaft.

The shape of the axial filtrate channels 9 appears particularly from FIGS. 3, 5 and 6. It is seen in FIGS. 5 and 6 that the cross section of the channels is polygonal and widening from the distal end (which is the right hand end in FIG. 3) towards the proximal end which is the outlet end communicating with the filtrate valve 10. More precisely, the shape shown is quadrangular and includes a first, substantially radial channel side wall 20, which is supported by and attached to a tubular shaft core 21, a channel bottom wall 22, a radial outer channel wall 23 and a second substantially radially channel wall 24. The first channel side wall 20 is constituted by a rectangular plate 25, the outer edge 26 of which defines the outer radius of the combined shaft 8, i.e. the shaft core 21 and the axial channels 9. The bottom wall 22 defines an angle with the axis C such that diametrically opposed bottom walls converge towards the outlet end of the channels (FIG. 3). The outer channel wall 23 is constituted by a rectangular plate 27 having one edge 28 attached to the radially outer edge 26 of the first side wall 20. In each outer channel wall 23 is provided a plurality of mounting apertures 29 for the filtrate tubes 11 of one axial row of such tubes. A radially outer edge 30 of the second channel side wall 24 is connected to the rectangular plate 27 such that the effective outer wall 23 widens towards the outlet end of the channel. Hereby, the second side walls incline relative to planes through the axis C, such as the horizontal plane HP in FIG. 5, where the second side wall 24, being in that position the lowest portion of the channel, downwardly inclines towards the outlet end. Since the first side wall 20 as well as the second side wall 24 are connected to the sloping bottom wall 22, it follows that both widen towards the outlet end (see FIG. 3).

It is realized that the axial channels not only widen their cross section towards the outlet end, but also that the lowest portions or "bottoms" of the channels slope towards the outlet end in rotational positions where filtrate is running through them. See for instance the channel in positions about 3 o'clock, where the "bottom" is the second side wall 24, the positions about 1 and 2 o'clock, where the second side wall 24 and the bottom wall 22 constitute the "bottom", and in position about 12 o'clock where the bottom wall 22 alone constitutes the "bottom". This sloping features of the axial filtrate channels contributes in an advantageous manner to the discharge of filtrate from the filter sectors, a.o. by contributing to the vacuum created by the barometric leg 14 and the filtrate tubes 11.

Likewise, in about 180° opposite rotational positions, where the filter sectors are being lowered into the suspension, the second side wall 24 and the bottom wall 22 slope upwards towards the outlet end and the filtrate valve, thus contributing to an untroubled displacement of air.

In order to avoid the problem of bundles of filter cake being trapped between an upper edge of the chute and a surface of a filter sector, the present invention proposes to arrange the chutes such that upper edges thereof, located vertically below locations of the filter sectors where a major part of filter cake removal takes place, are positioned such that there is no vertical slot between such edges and a filter sector surface. In other words, the chute edges and the filter sector surfaces are at least located in the same vertical plane, and preferably the chute edges are displaced in an axial direction of the axis C, such that a chute edge is positioned in a radial plane located closer to a median plane DC of a filter sector than a radial plane through a radially inner portion of a filter sector.

A preferred outline of a chute 17 according to the present invention is shown in FIG. 4, and particulars of the chute are shown more in detail in FIGS. 7–10. The chute has a flat bottom 31 including about 45° to a horizontal plane and extending from radially outside the filter sectors above the discharge screw 18 to a position above the shaft that is preferably located somewhat past a vertical plane VP (FIG. 4) through the axis C of the shaft. In the embodiment shown, the bottom 26 is rectangular. Axially spaced, substantially vertical side walls 32, 33 extend perpendicularly from the bottom. Starting from the upper end of the bottom 31, the side walls 32, 33 have upper, radially outer edges 34, 35, respectively, that are arcuately curved and have their center in the axis C of the shaft. As is seen particularly in FIG. 4, the radius of the curved edges 34, 35 is less than the radially inner edges 12' of the filter seconds 12.

Figure 10:
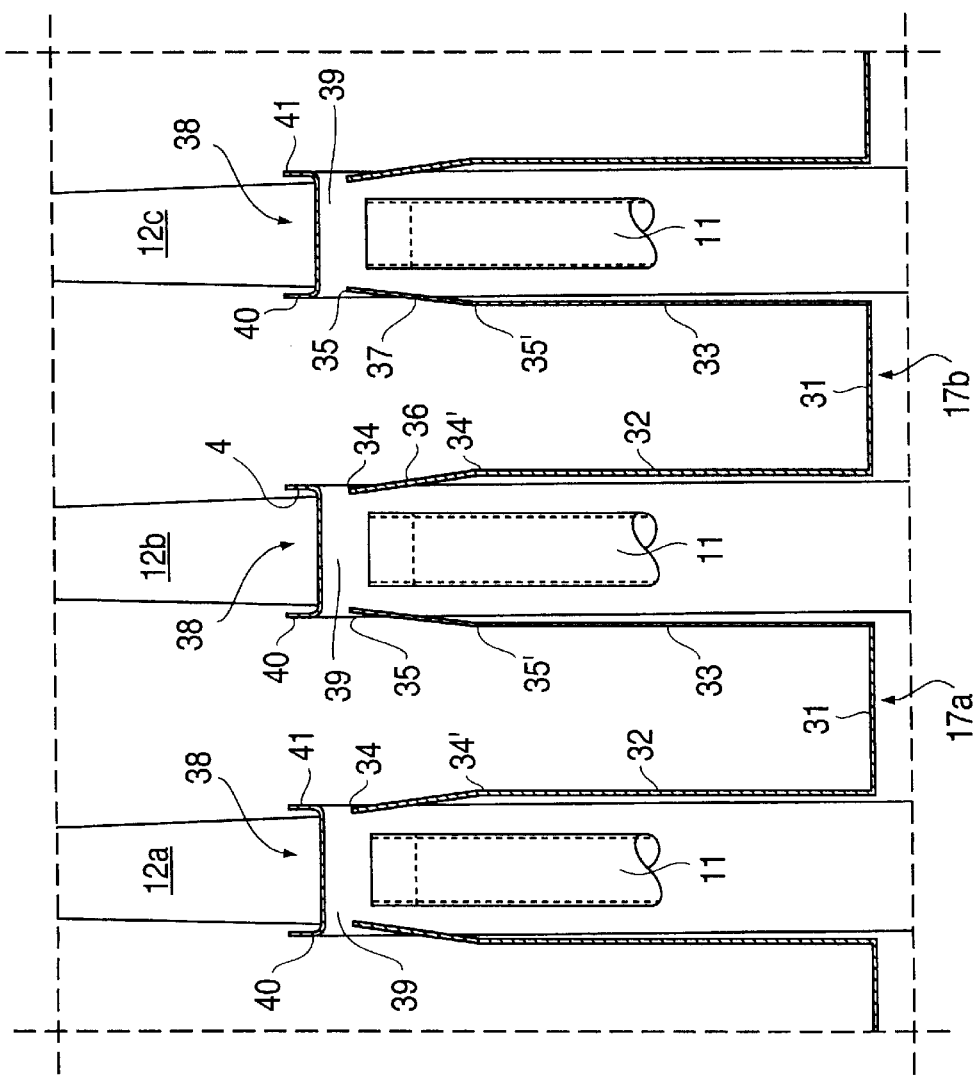
FIG. 10 is an enlarged sectional view through the preferred embodiment of the chute showing its relation to adjacent filter disks.

In the preferred embodiment of chute according to FIGS. 7–10, radially outer portion 36, 37 of the side walls 32, 33, including the curved edges 34, 35, are outwardly angled along a curved line 34', 35', respectively, co-axial to the edges 34, 35, so as to widen the open area of the chute. This is best seen in FIG. 10, showing radially inner portions of three filter disks 12a, 12b and 12c and particularly one complete chute 17a located between adjacent disks 12a and 12b, and one complete chute 17b located between adjacent disks 12b and 12c.

The radially inner edges of the disks are constituted by arcuately curved U-sections 38 having web portions 39 and spaced flanges 40, 41. In practice, each filter disk has a circularly shaped U-section as a common support for all its filter sectors, the filtrate tubes 11 being attached to the web portion 39 of the U-section as shown in FIG. 10. From the flanges 40, 41 each filter sector tapers radially outwards as seen particularly in FIGS. 1–3. Thus, the flanges form the widest portion of each filter sector.

In order to provide space for the outwardly inclined portions 36, 37 of the side walls and their outer edges 34, 35 radially inside the filter disks, the filtrate tubes 11, radially extending in a plane perpendicular to the axis C, have less extension in the axial direction of the axis than the radially inner edges 12' of the filter disks, i.e., the web portion 39 in which the filtrate tubes 11 are attached. The filtrate tubes are attached to the U-sections 38 symmetrically about the central plane DC of each disk. Preferably, the filtrate tubes have rectangular cross sections, as shown in FIG. 10.

Evidently, due to the fact that the edges 34, 35 of the side walls of the chute are located "under" the U-section 38, i.e., the widest portion of a filter sector, filter cake material falling down along a filter sector will be securely caught within the chute without any risk of entering the substantially axially extending, relatively small radial space remaining between the edges 34, 35 and the web portion 39.

Apparently, it is not possible to have the upper edges of a chute shaped as now discussed along their entire extension towards the exterior of the disks, because the filter sectors have to pass the chute during their rotation. Thus, the arcuate edges 34, 35 transform into substantially horizontally extending edges 42, 43 that upwardly terminate outwardly bent portions 44, 45 of the side walls 32, 33. It is seen in FIGS. 7 and 9 that the outwardly bent portions 44, 45 are bent along straight lines 44' and 45', thus gradually widening the upper edges 42, 43 of the chute to adapt it to tapering shape of the filtering disks.

Figure 11:
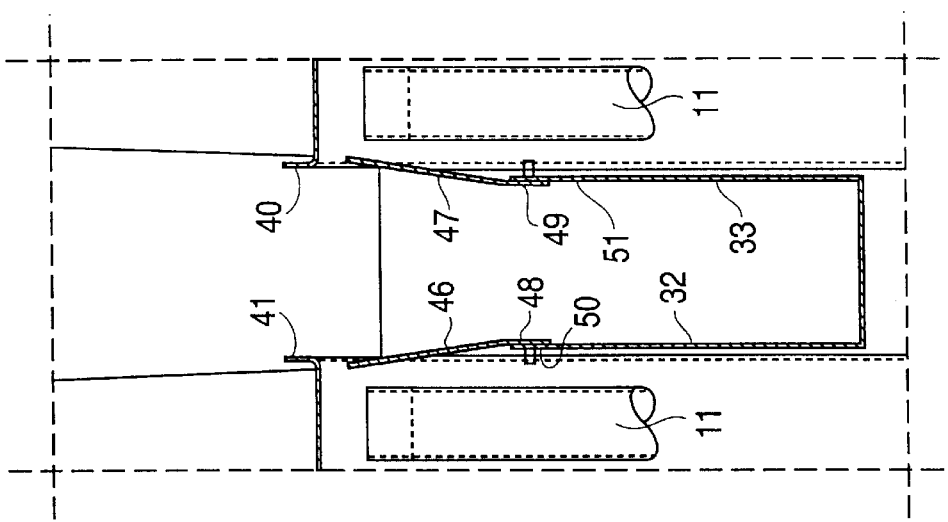
FIG. 11 is a view corresponding to that of FIG. 10 of a practical embodiment of the chute according to FIG. 10.

A practical embodiment of the chute according to FIG. 10 is shown in FIG. 11. In order to facilitate mounting of the chute between adjacent filter disks, the angled, diverging portions of the side walls 32, 33 are made as separately mountable and detachable elements 46, 47 having mounting portions 48, 49 respectively, shown to be fastened to the side walls 32, 33 by means of screws and nuts 50, 51.

Figure 12:
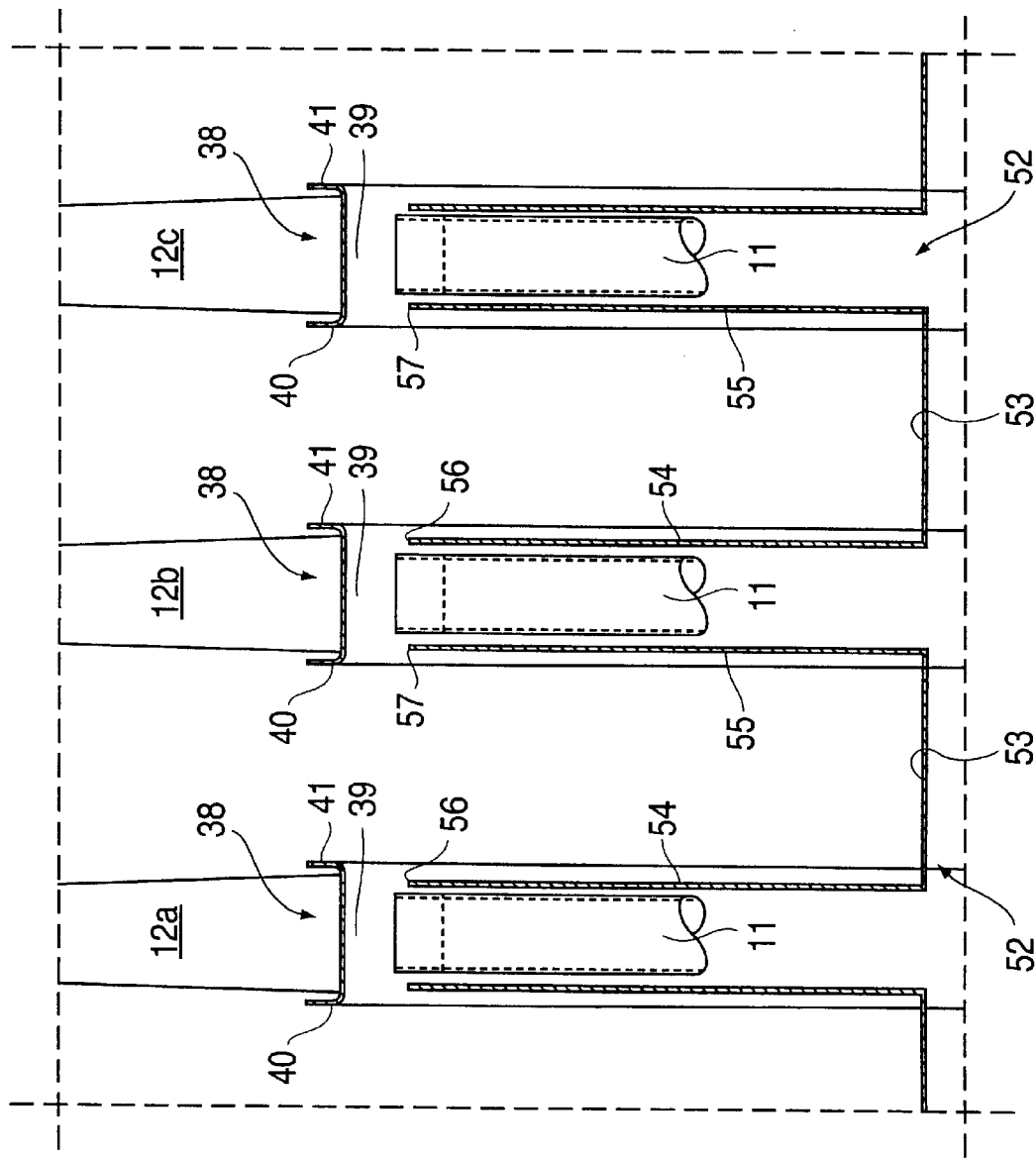
FIG. 12 is a view corresponding to that of FIG. 10 of a second embodiment of the chute.

An alternative embodiment of chute 52 is shown in FIG. 12. This chute has a wider bottom 53 and straight side walls 54, 55 that are perpendicular to the bottom. The width of the bottom is such that the upper edges 56, 57 of the side walls are located well beyond radial planes defined by the flanges 40, 41 of the U-section 38 adjacent filter sector 12a, 12b and 12b, 12c, respectively.

Figure 13:
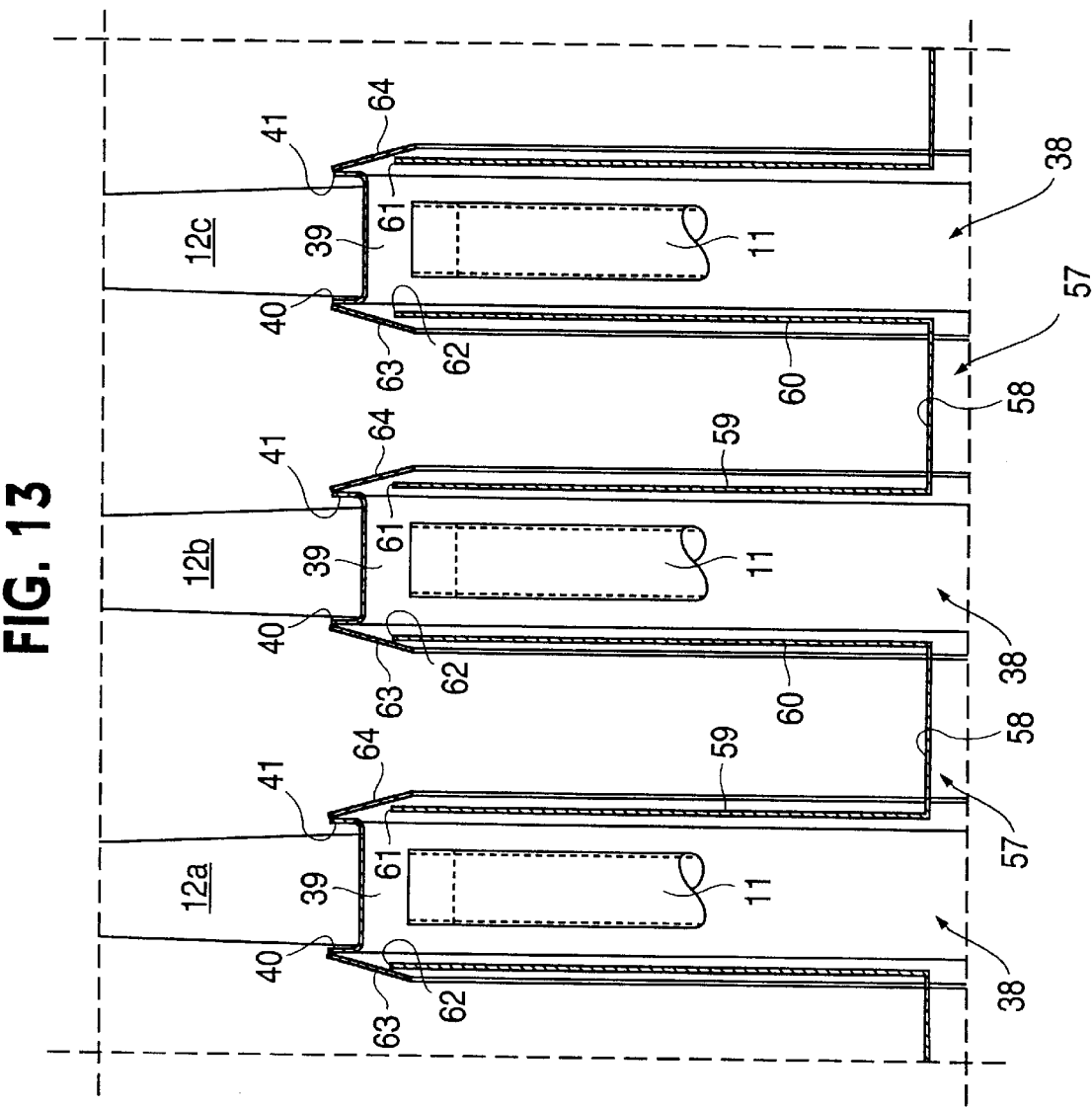
FIG. 13 is a view corresponding to that of FIG. 10 of a third embodiment of the chute.

Another embodiment of a chute is shown in FIG. 13. Here, the bottom 59 has substantially the same width as the bottom 31 according to FIG. 10, i.e., less than the axial distance between flange portions 40, 41 of the U-sections 38 of adjacent filter sectors. The straight side walls 60, 61 of the chute are perpendicular to the bottom. Thus the upper edges 62, 63 of the side walls are not located "under" a respective inner edge of a filter sector. In order to guide filter cake material falling from a sector into the chute, the radially inner edges of the filter sectors are provided with shield means leading filter cake material into the chutes. In practice, the flange portions 40, 41 of the U-sections 38 are provided with diverging plates 64, 65 that straddle the upper edges 62, 63 of adjacent chutes 58.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rotating filter including at least two adjacent annular filter disks each having a plurality of filter elements (12a/12b, 12b/12c) and each being carried by a shaft (8) for rotation therewith about an axis (C) perpendicular to a respective central plane (DC) of the filter disks, said filter disks being partly submerged in a vessel (1) adapted to contain to a certain level (L) a liquid to be filtered, and said filter further including a discharge chute (17; 52; 57) extending into a space between said adjacent filter disks for discharging solids deposited on and removed from facing filtering means (13) of said filter elements, said discharge chute having upper edges (34, 35; 56, 57; 61, 62), characterized in that an axial spacing between a first portion (34, 35; 56, 57; 61, 62) of said upper edges located radially inside radially inner edge portion (12') of facing filtering means of said adjacent filter disks is not less than axial spacing between said inner edge portions (12'), and that an axial spacing between a second portion (42, 43) of said upper edges located radially outside said radially inner edge portions (12') is not more than said axial spacing between said inner edge portions of facing filtering means.

2. A filter according to claim 1, characterized in that each filter element (12) is spaced from said shaft by a spacing means (11) having less extension in an axial direction towards an adjacent filter disc than a radially inner end (12') of said filter element.

3. A filter according to claim 2, characterized in that the spacing means is a filtrate tube (11) connecting a filter element (12) with a filtrate channel (9) of the shaft.

4. A filter according to claim 2, characterized in that said first portion of said upper edges define an arc about said axis (C) having a first radius, and that said radially inner end (12') of all filter elements (12) defines a circle having its center on said axis and a second radius larger than said first radius.

5. A filter according to claim 1, characterized in that said upper edges (34, 35) of said first portion terminate diverging portions (36, 37; 46, 47) of opposed side walls (32, 33) of said chute (17).

6. A filter according to claim 5, characterized in that said diverging portions (46, 47) are separately mountable and detachable side wall elements.

7. A rotating filter including at least two annular filter disks each having a plurality of filter elements (12) and each being carried by a shaft (8) for rotation therewith about an axis (C) perpendicular to respective central plane (DC) of the filter disks, said filter disks being submerged in a vessel (1) adapted to contain to a certain level (L) a liquid to be filtered, and said filter further including discharge means (17) extending into a space between adjacent filter disks for receiving and discharging solids deposited on and removed from facing filtering means of said adjacent filter elements, characterized by the combination of the following features:

a) each filter element (12) is kept at a radial distance from the shaft (8) by a tube means (11) for discharge of filtrate, said tube means having less extension in an axial direction towards said adjacent filter element than a radially inner end (12') of said filter element;

b) each means for discharging solids comprises a chute (17) having a bottom portion (31) downwardly inclining from a position above said shaft (8) to a position radially outside said filter disks and having side walls (32, 33) extending from said bottom portion, said side walls having upper edges (34, 35) axially defining an effective axial width of said chute as regards receiving solids removed from said facing filtering surfaces, said axial width being not less than an axial distance between radially inner ends (12') of adjacent filter sectors along a portion (34, 35) of said chute located radially inside said radially inner ends (12') of filter sectors of said at least two filter disks, and said axial width being less than said axial distance between radially inner ends (12') of adjacent filter sectors along a portion (42, 43) of said chute located radially outside said inner ends of filter sectors of said at least two filter disks.

\* \* \* \* \*